Feb. 24, 1931.                          D. S. BADENOCH                          1,794,053
                    MEANS FOR CONNECTING CHANNEL MEMBERS AND
                       OTHER MEMBERS OF CURVED SECTIONS
                              Filed Oct. 19, 1929            2 Sheets-Sheet 1

INVENTOR
David Sutherland Badenoch

Barker & Colling
BY
ATTORNEYS

Feb. 24, 1931.  D. S. BADENOCH  1,794,053
MEANS FOR CONNECTING CHANNEL MEMBERS AND
OTHER MEMBERS OF CURVED SECTIONS
Filed Oct. 19, 1929  2 Sheets-Sheet 2

INVENTOR
David Sutherland Badenoch
Barker & Collings
BY  ATTORNEYS

Patented Feb. 24, 1931

1,794,053

UNITED STATES PATENT OFFICE

DAVID SUTHERLAND BADENOCH, OF LEICESTER, ENGLAND

MEANS FOR CONNECTING CHANNEL MEMBERS AND OTHER MEMBERS OF CURVED SECTIONS

Application filed October 19, 1929, Serial No. 400,866, and in Great Britain October 20, 1928.

This invention comprises a new or improved means for connecting channel members and other members of curved section, and has particular, although not exclusive reference to means for providing a connection or jointing between the separable parts of a pleasure boat of the type comprising two or more channel or bow-sectioned parts provided with transversely extending seats, the said parts being adapted to be taken apart and packed in a confined space for transportation.

The object of this invention is to provide a simple and efficacious liquid-tight connecting means for channel or other similarly sectioned members and more particularly to provide an improved readily releasable water-tight connection for the separable parts of pleasure boats of the above mentioned type.

The present invention consists in a method of connecting curved members wherein the said members are located or positioned between a plurality of curved retaining members at least one of which is a leaf spring and means such as bolts and screws for clamping the said curved members together.

The connecting means may comprise a curved member which is substantially rigid and is located at the exterior of the channel or curved members being connected, a plurality of superposed curved springs located interiorly of the said channel members and having a tendency to bow outwardly and one or more screwed bolts or the like passing from the outer connecting member through the members being connected and the interior leaf springs, the said one or more bolts functioning to cause the interior springs to press the said channel members together and against the outer connecting member to provide a liquid-tight joint between the said members.

The invention is particularly applicable for connecting the curved transverse end frame members of a sectional pleasure boat comprising a plurality of boat sections each of which embodies curved transverse end frame members spaced apart and connected by longitudinal frame members, the said framework supporting a covering of sheet metal, plywood or other sheet material and the several sections being connected by means of the present invention to constitute a boat.

For the purpose of enabling this invention to be more readily understood, reference will now be made to the accompanying drawings wherein:—

Figure 1:
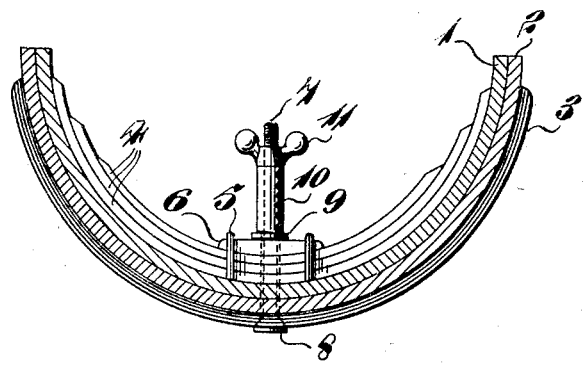
Fig. 1 is a cross sectional elevation illustrating two channel members connected together by means according to the present invention.

In the simple form of the invention illustrated in Fig. 1, two channel sectioned members 1, 2, are connected in a readily releasable liquid-tight manner by means of a substantially rigid curved bar or strap 3 extending around the exterior of the outer channel member 2. A plurality of superposed leaf springs 4, conveniently held together by means of stirrups or straps 5 and a bar 6, are provided in the interior of the inner channel member 1, the said springs having a normal tendency to bow outwardly or straighten themselves.

Passing through registering holes provided centrally in the outer strap 3, the channel members 1 and 2, the leaf springs 4 and the supporting bar 6, is a bolt member 7 provided with a screw thread along its upper parts. The lower extremity of the bolt 7 is provided with a tapering or part conical enlargement 8 adapted to fit tightly in the hole provided centrally in the outer strap 3, which hole is preferably tapered to conform with the said enlargement. A washer 9 and spacing sleeve 10 may be provided encircling the upper parts of the bolt 7 and interposed between the bar 6 supporting the springs and a nut 11 screwed upon the said bolt, the said nut conveniently having enlargements or projecting parts by means of which it may be tightly screwed upon the bolt by hand.

Upon the parts being assembled and the nut 11 tightened upon the bolt 7, the channel members 2 are tightly clamped between the leaf springs 4 and the outer strap 3 and an efficient liquid-tight connection for the said channel members is provided.

If the outer member 3 is provided at all resilient or flexible, it is preferable that same should be arranged normally to bow slightly inward.

If desired, the substantially rigid strap member may be provided in the interior of the channel members and a plurality of leaf springs may be positioned at the exterior thereof. In other words, the arrangement illustrated may be reversed, it being understood that in the reversed positions, the springs would be tempered so as to have a tendency to bow inward, i. e., increase the curve thereof.

Leaf springs 4 may be provided at the interior and exterior of the members to be connected and it will be understood that in such modification the interior springs will be arranged and tempered normally to spring outwardly and the exterior springs arranged normally to spring inwardly.

The superposed leaf springs are preferably of slightly varying thickness.

In another modification, a single leaf spring may be substituted for the plurality of superposed leaf springs 4 and, instead of the parts being clamped together by means of a nut screwed upon a central bolt, the said bolt may have a screw thread located within an internally threaded hole provided in one or more of the members to be clamped together.

A plurality of suitably positioned clamping bolts may be provided, if desired.

Figure 4:
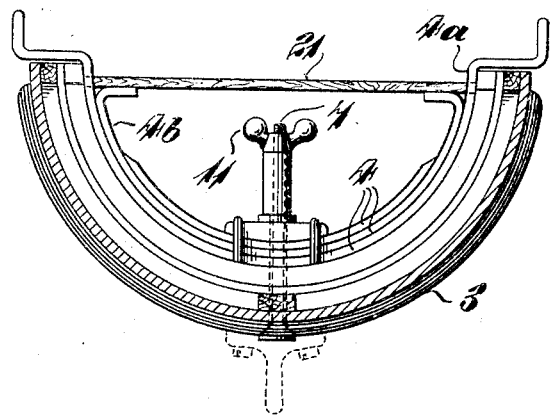
Fig. 4 is a cross-sectional elevation on line A—A of Fig. 2 looking in the direction of the arrows.
Figure 2:
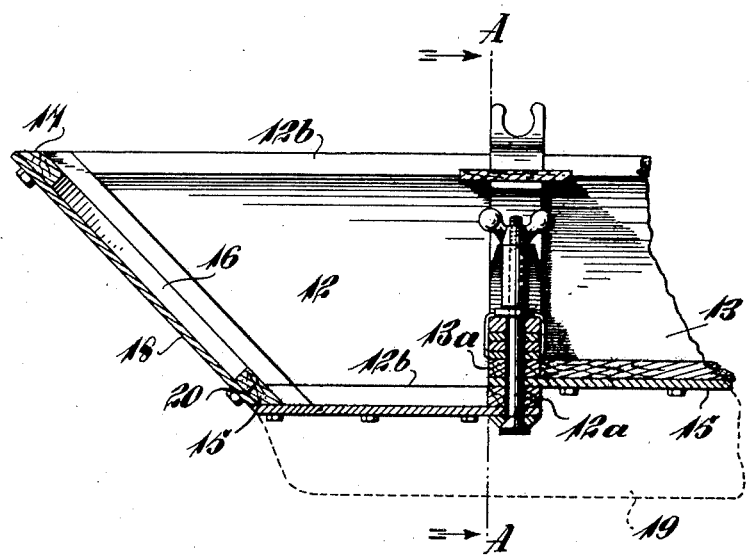
Figs. 2 and 3 are part-sectional elevations of the front and rear parts respectively of a sectional pleasure boat the separable sections of which are connected by means according to the present invention.
Figure 3:
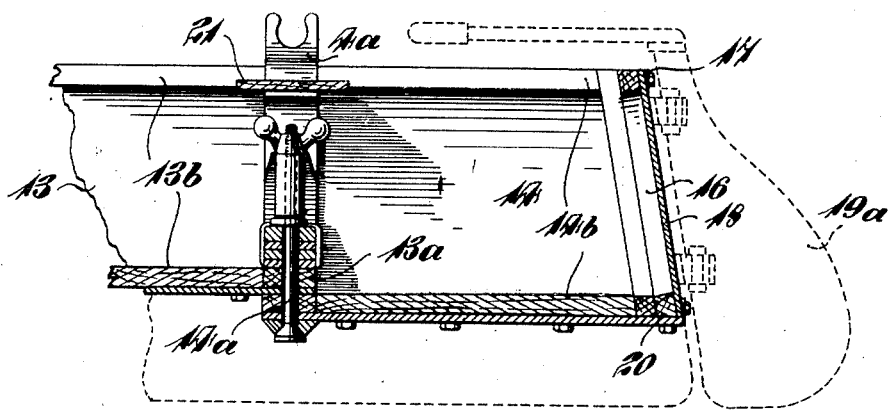

This invention may with advantage be applied as a means for connecting in a readily detachable manner, the separable parts of a sectional boat or punt, as illustrated in Figures 2, 3 and 4.

A boat of the above type may comprise three separable sections 12, 13 and 14, each embodying curved transverse end frame members 12a, 13a, and 14a spaced apart and connected by longitudinal frame members 12b, 13b and 14b, an outer covering 15 of plywood, sheet metal or other suitable flexible material being stretched transversely across each of the said frames. Each extremity of the boat may be comprised by a substantially U-shaped frame member 16 and an upper transverse frame member 17 secured thereto; a suitably shaped flat sheet 18 of the covering material being secured across each of the said end frames.

The end portions of the boat may be secured by screws, bolts or other suitable means and the covering may be secured to the frame in a similar manner. A detachable keel 19 and rudder 19a, indicated in dotted lines, may also be provided and one or more wire rod or other stretching members (not shown), conveniently having associated screw devices, may be connected to the end portions 16 and tightened to impart rigidity to the boat.

Rubber or other packing strips may be provided at the joints 20 or, alternatively, this may be a spigot and socket or tongue or groove joint, the object being to render the said joint water-tight.

Connecting means according to the present invention may be provided at both extremities of the central section 13 of the boat to connect the said section in a water-tight manner to the front and rear sections 12 and 14. The curved end frame members 13a are accommodated within the similarly shaped end frame members 12a and 14a of the front and rear sections of the boat respectively and each connecting means comprises an outer substantially rigid strap 3 and inner curved leaf springs 4 as described in connection with the arrangement shown in Figure 1.

Upon each nut 11 being tightened upon its bolt 7, the inner frame members of the central section 13 are clamped tightly upon the end frame members of the front and rear sections of the boat and water is prevented from gaining access to the interior of the craft.

The extremities of the leaf spring 4a may be suitably bent and shaped as shown to constitute row locks and the extremities of the leaf spring 4b may be bent as shown in Figure 4 to support the transverse seat members 21 which also ensure the lateral stability of the boat.

The boat may be propelled by means of a small out-board motor unit or a sail, oars, paddles or punting pole may be provided in connection therewith. Alternatively, the boat may be towed.

The means described above and provided according to this invention for connecting the boat sections together are readily releasable and enable the said sections to be quickly taken apart and packed in a confined space for transportation upon a motor vehicle, trailer or other conveyance.

If desired, the boat may be formed in two main separable sections only, each having frame members and a cover as above described or, alternatively, comprising a substantially channel shaped sheet of metal or other suitable material having upright or inclined end portions.

I claim:

1. Means for connecting a plurality of curved members in superposed relation comprising in combination a leaf spring which has a tendency to straighten itself longitudinally located interiorly of said curved members and transversely thereof, a rigid member located exteriorly and transversely of said curved members and shaped to conform to and lie close against the outer curved member, and screw means for clamping the said curved members between the said interior leaf spring and the said exterior rigid member.

2. In a sectional boat embodying a plurality of curved sections connecting the said sections together in a readily removable and water-tight manner by locating or positioning the said sections between a plurality of curved retaining members at least one of which is a leaf spring and clamping the said curved members together by screw means.

3. Means for connecting together in a readily removable and water-tight manner a plurality of curved parts of a sectional boat, comprising a rigid member positioned exteriorly of the said parts to be connected, a plurality of superposed curved leaf springs positioned interiorly of said members, one or more of said leaf springs being shaped to enable it to support a seat in the boat, and screw means for clamping the said curved members together.

4. Means for connecting together in a readily removable and water-tight manner a plurality of curved parts of a sectional boat comprising a rigid member positioned exteriorly of the said parts to be connected, a plurality of superposed curved leaf springs positioned interiorly of said members, one of said leaf springs being shaped to constitute row-locks or supports for the oars of the boat and screw means for clamping the said curved members together.

DAVID SUTHERLAND BADENOCH.